2,911,996
REEL FOR A GARDEN HOSE
Karl J. Kollmann, Erie, Pa.
Application July 18, 1957, Serial No. 672,787
6 Claims. (Cl. 137—355.12)

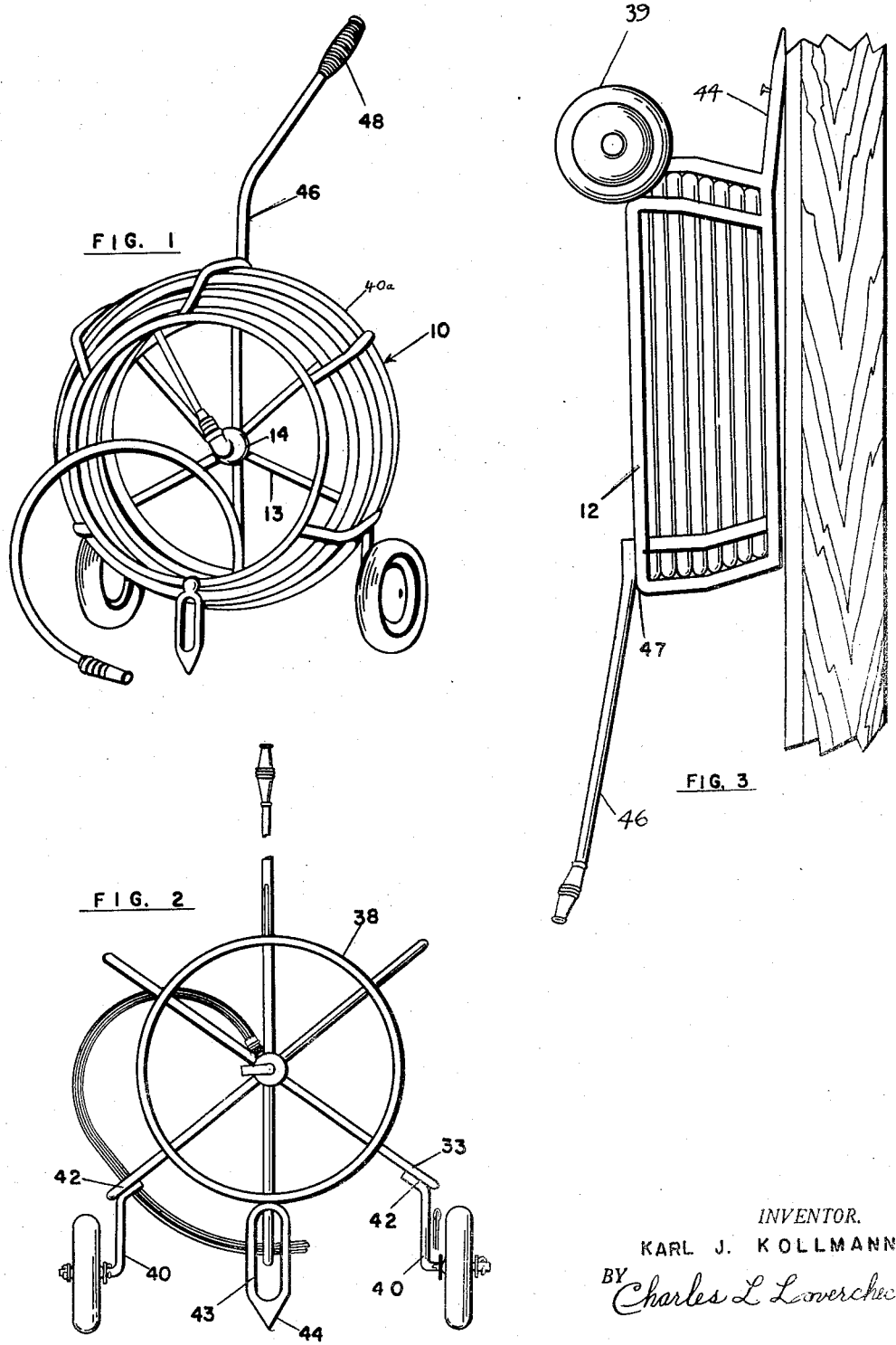

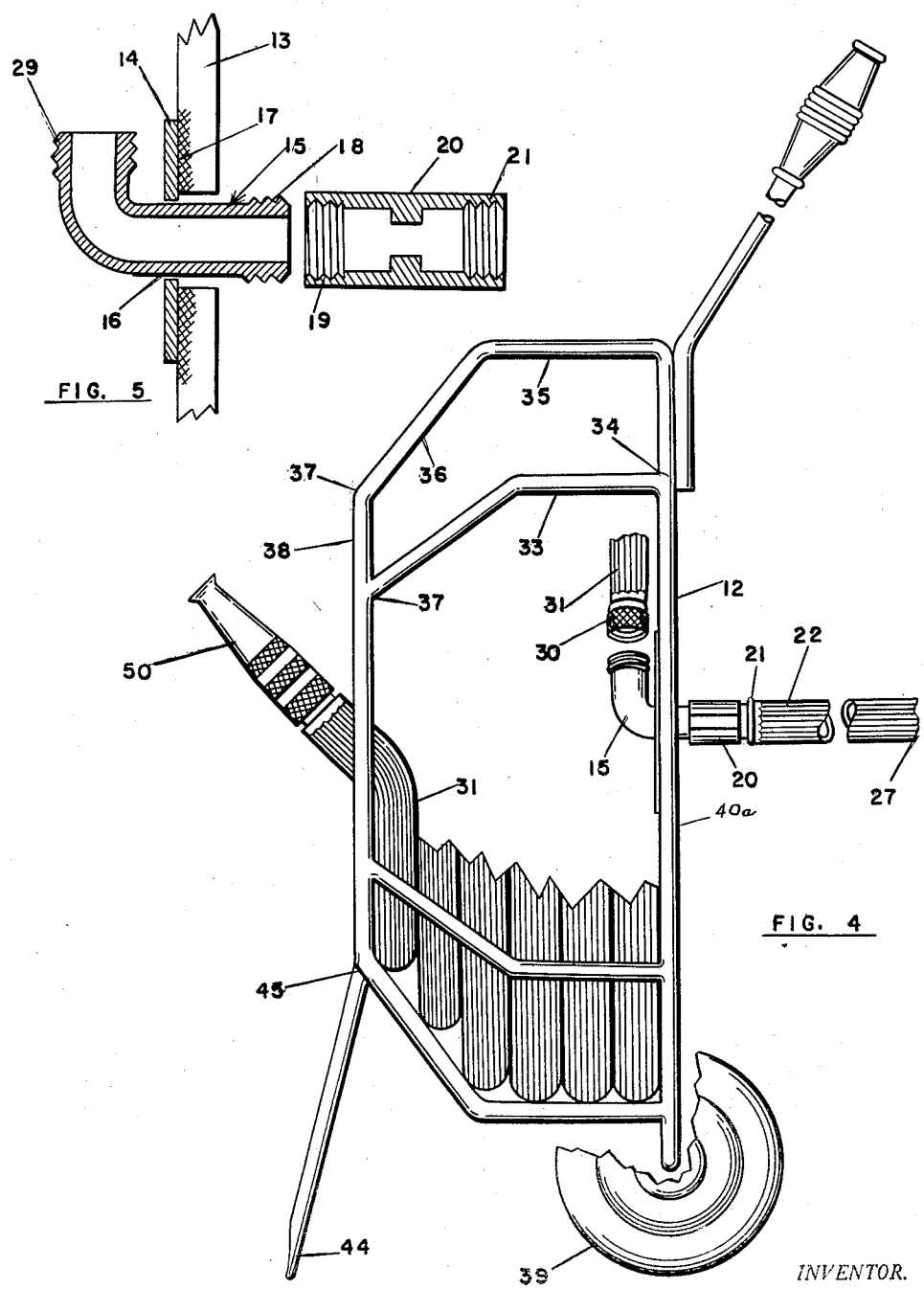

This invention relates to reeling devices and, more particularly, to devices for storing hoses, especially garden hoses.

Reels for storing garden hoses which have been used in the past have usually comprised a spool upon which the hose was wrapped. The hose had to be tied in place because when wrapped on the spool, the hose was bent and the natural tendency for the hose to straighten out somewhat caused it to try to free itself from the reel.

The present invention contemplates a device for storing garden hose wherein the hose is stored inside of the device and the natural tendency of the hose to straighten itself causes it to remain snugly in its storing device.

It is, accordingly, an object of this invention to provide a device for storing hose which is simple in construction, economical to manufacture, and simple and efficient to use.

Another object of the invention is to provide a device for storing hose wherein the hose itself tends to hold itself in the storing device.

Still another object of this invention is to provide a hollow storing device for hose wherein the hose is attached to a coupling on the device and the coupling has means thereon for connecting it to a sill cock.

A further object of the invention is to provide an improved device for storing hose.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is an isometric view of a hose storing device according to the invention;

Fig. 2 is a front view of the storing device;

Fig. 3 is a view of the device shown hanging on a wall;

Fig. 4 is a side view of the device; and

Fig. 5 is an enlarged view of the coupling of the device.

Now with more specific reference to the drawings, a hose storing device 10 is shown which is made up of a rearwardly disposed spider 12 having radially disposed legs 13 attached at the center thereof to a member 14. The legs 13 are attached at the outer ends thereof to a rear ring 40a. The member 14 has a coupling 15 attached thereto at 16 by brazing, welding, or the like. The member 14 may be in the form of a round disk shaped plate welded to the radially disposed legs 13 at 17.

The inner end of the coupling 15 is threaded at 18 to receive the end of a hose fitting 20 at 19, the other end of the hose fitting 20 being attached to a hose link 22 at 21 in the usual manner. The hose link 22 may be attached at its distal end 27 to a sill cock or the like. A threaded end 29 of the coupling 15 is attached to a coupling 30 of a hose 31 and the hose 31 is coiled inside the storing device 10 as shown. Laterally disposed rods 33 are welded to the rear ring 40a at 34, they extend forwardly at 35 and then inwardly at 36, and are welded at 37 to a front ring 38.

Wheels 39 are rotatably supported on hubs 40 and the hubs 40 are welded to the rods 33 at 42. An anchor member 43 is in the form of a link and has a point 44 which extends downwardly and forwardly. The member 43 is welded to the front ring 38 at 45. A handle 46 is welded to the rear ring 40a at 47 and extends upwardly and rearwardly to terminate in a hand engaging portion 48.

In use, the hose 31 will be coiled inside of the rods 33 and the spider legs 13 will prevent it from moving rearwardly. The natural tendency of the hose 31 to straighten itself will cause it to remain firmly in engagement with the rods 33 and, therefore, to be snugly supported in the hose storing device 10.

The hose link 22 may be attached to a sill cock and, in order to remove the hose link 22 for sprinkling, it is only necessary for the operator to grasp the nozzle 50 and pull it forward. This will cause the point 44 to embed itself in the ground and the hose will then naturally pay itself out of the storing device 10. For storage, the device may be hung up as shown in Fig. 3.

The foregoing specification sets forth the invention in its preferred practical forms but the structure shown is capable of modification within a range of equivalents without departing from the invention which it is to be understood is broadly novel as is commensurate with the appended claims.

The embodiments of the invention in which an exclusive property or privilege is claimed are defined as follows:

1. A device for storing hose comprising a spider, a coupling attached to said spider, the outer portion of said spider having means extending laterally therefrom, then toward each other and terminating in spaced relation to each other and defining a substantially large opening, a hose having one end thereof attached to said coupling, and means on said coupling to attach it to a sill cock, said hose being coiled in said device and held therein by said laterally extending means, said hose being adapted to be payed out from said device by pulling on the distal end thereof.

2. The device recited in claim 1 wherein said spider comprises a central member having said coupling thereon and leg members radiating therefrom, and said laterally extending means comprises rods attached to means on the ends of said leg members and a ring attached to the front ends of said leg members.

3. The device recited in claim 2 wherein said device has ground engaging wheels attached to said spider and an anchor member attached to said ring and extending downwardly therefrom.

4. The device recited in claim 3 wherein an upwardly extending handle is attached to said spider and extends upwardly therefrom.

5. A device for storing and transporting hose comprising a spider made up of a central member with legs radiating therefrom, a rear ring attached to the outer ends of said legs, rods attached to said ring and extending forwardly and inwardly therefrom, said rods being attached at their front ends to a front ring, wheels, means attaching said wheels to said spider, an anchor member attached to said front ring and extending downwardly therefrom, and a handle attached to said spider and extending upwardly therefrom.

6. The device recited in claim 5 wherein a coupling is attached to said spider, means is provided on said coupling to attach it to a sill cock, and a hose is attached to said coupling and coiled in said device with the distal end of said hose extending through said front ring.

References Cited in the file of this patent
UNITED STATES PATENTS

| | | |
|---|---|---|
| 203,037 | Hebard | Apr. 30, 1878 |
| 943,202 | Struss | Dec. 14, 1909 |
| 1,653,103 | Keys | Dec. 20, 1927 |